H. S. HART.
BALL CAGE.
APPLICATION FILED NOV. 5, 1910.
988,336. Patented Apr. 4, 1911.
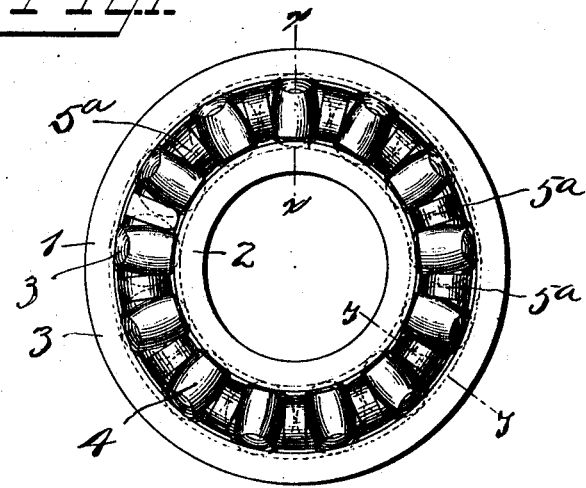
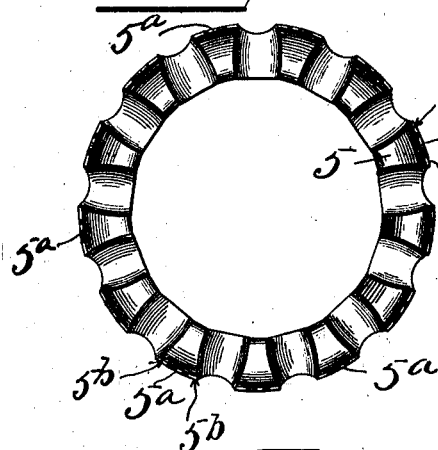
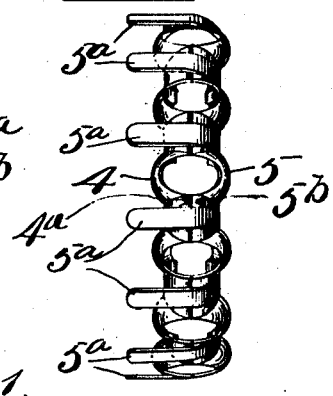
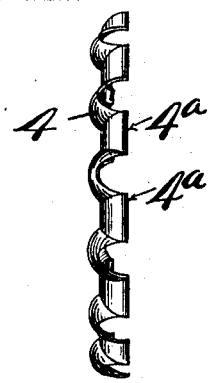
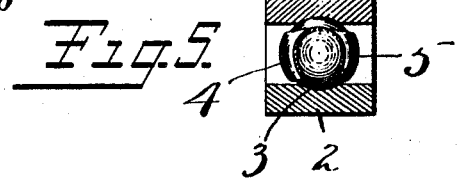
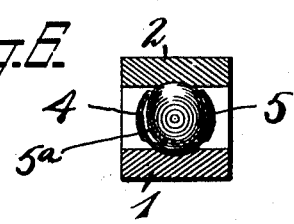
Witnesses:
Fred K. M. Dannenfelser
Chas. M. Peart
Inventor
H. S. Hart
By his Attorneys

UNITED STATES PATENT OFFICE.

HOWARD S. HART, OF NEW BRITAIN, CONNECTICUT, ASSIGNOR TO THE HART & COOLEY COMPANY, OF NEW BRITAIN, CONNECTICUT, A CORPORATION OF CONNECTICUT.

BALL-CAGE.

988,336.

Specification of Letters Patent.

Patented Apr. 4, 1911.

Application filed November 5, 1910. Serial No. 590,772.

*To all whom it may concern:*

Be it known that I, HOWARD S. HART, a citizen of the United States, residing at New Britain, county of Hartford, State of Connecticut, have invented certain new and useful Improvements in Ball-Cages, of which the following is a full, clear, and exact description.

My invention relates to improvements in annular ball cages for ball bearings.

In the accompanying drawings Figure 1 is a side elevation of a ball bearing complete showing the cage in place. Fig. 2 is an inside view of one side of the ball cage before assembling. Fig. 3 is an edge elevation of the two parts of the ball cage placed together in final position, but not yet secured together. Fig. 4 is an edge elevation of one part, or section, of the ball cage. Fig. 5 is a cross section on the line $x$—$x$, Fig. 1. Fig. 6 is a cross section on the line $y$—$y$, Fig. 1.

1 and 2 represent the two bearing rings of a ball bearing of ordinary construction too well understood to require detailed description, it being sufficient to merely state that both rings 1 and 2 are provided with the usual oppositely arranged ball race-way grooves in which are located balls 3—3.

My improved cage is so constructed that a maximum number of balls may be provided and yet said cage will operate to effectively hold all of the balls slightly apart so that there will be no rubbing contact of one ball against another. The cage is made up of two ring-plates 4—5 struck up from sheet-metal, both being preferably recessed to form shallow ball-receiving-pockets, as shown, said recesses so conforming to the balls that the walls of said recesses alone will prevent said balls, when the bearing is assembled, from moving toward or away from one another to any material extent. $5^a$—$5^a$ are clenching fingers formed on the outer edge of one only of said plates, 4—5. In this instance said fingers are formed at the outer edge of the ring-plate 5 and project laterally therefrom so as to overstand, or overlap, the opposite ring-plate 4. The number of fingers employed may, if desired, and, indeed, as shown, correspond in number to the spaces between the balls 3—3 but a lesser number of fingers may be employed since said fingers in no way serve to space the balls, that work being wholly accomplished by the walls of the aforesaid shallow ball recesses. When the bearing, such as illustrated, is to be assembled, the balls are first inserted between the rings 1—2 in any desired manner, after which the ring-plates 4—5 are applied to the opposite sides, following which, the ends of the fingers $5^a$ are curled down around the ring 5, thereby tying together both of said plates and causing them to embrace and hold the balls in the desired spaced relation. The outer edges of the plates 4—5 are preferably shouldered at points $4^a$—$5^b$, said shoulders abutting each other (when the rings are assembled) in such a manner as to prevent too snug clamping of said rings upon the balls, whereby said balls may be permitted to turn at all times with the desired degree of uniform freedom. Inasmuch as when the rings are assembled the fingers $5^a$ will extend outside of the ring 4, it is obvious that the shouldered portions $5^b$—$5^b$, which constitute in part the spacing means, should be bent down into the plane of the metal of the ring 4 opposite thereto and against which said shouldered portions $5^b$ are designed to abut.

It should be understood that I contemplate that various changes in the above described structure may be made without departing from the spirit or scope of this invention, for example each ball recess referred to may be formed in any way so long as it furnishes a wall to retain the ball standing therein. To that end, the recess might be formed by striking the metal back to form a shallow cupped shaped cavity or might be punched out in the form of a round opening.

What I claim is:

1. In an annular ball cage, two ring plates, both of said plates having oppositely arranged ball receiving recesses therein, a plurality of fingers integrally formed with, and at, the outer edge of one of said plates only, said fingers extending laterally and engaged with the opposite ring plate to hold both ring plates in coöperative relation.

2. In an annular ball cage, a pair of annular ring plates, ball receiving recesses in each plate, each recess being arranged to partially embrace a ball, a plurality of fingers on the outer edge of one of said plates only, said fingers corresponding in number to the spaces between the ball receiving recesses, said fingers extending laterally from the plate on which they are formed, the ends of said fingers being curled around the other plate to hold both plates in coöperative relation.

3. In an annular ball cage, two ring plates, one of said plates having ball receiving recesses therein, a plurality of fingers on the outer edge of one of said ring plates only, said fingers extending laterally and engaging the opposite ring plate to tie both ring plates together, and means formed at the outer edge of one of said plates to hold said plates in proper spaced relation.

HOWARD S. HART.

Witnesses:
NORMAN P. COOLEY,
R. C. TINCHELL.